(12) United States Patent
Kim et al.

(10) Patent No.: US 9,344,429 B2
(45) Date of Patent: May 17, 2016

(54) NETWORK APPARATUS BASED ON CONTENT NAME AND METHOD FOR PROTECTING CONTENT

(75) Inventors: Eun Ah Kim, Seoul (KR); Dae Youb Kim, Seoul (KR); Byoung-Joon Lee, Seongnam-si (KR); Mi Suk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/492,967

(22) Filed: Jun. 11, 2012

(65) Prior Publication Data

US 2012/0317613 A1    Dec. 13, 2012

(30) Foreign Application Priority Data

Jun. 9, 2011  (KR) .................. 10-2011-0055544

(51) Int. Cl.
*H04L 29/06* (2006.01)
*G06F 21/62* (2013.01)

(52) U.S. Cl.
CPC ............ *H04L 63/10* (2013.01); *G06F 21/6209* (2013.01)

(58) Field of Classification Search
CPC .... H04L 63/10; H04L 63/107; G06F 21/6209
USPC .......................................................... 726/1
See application file for complete search history.

(56) References Cited

U.S. PATENT DOCUMENTS

| | | | |
|---|---|---|---|
| 6,981,029 B1 | 12/2005 | Menditto et al. | |
| 7,512,578 B2 * | 3/2009 | Abnous et al. | 706/47 |
| 7,592,906 B1 * | 9/2009 | Hanna et al. | 340/506 |
| 7,908,481 B1 | 3/2011 | Donzis et al. | |
| 7,917,649 B2 | 3/2011 | Soukup | |
| 7,982,595 B2 * | 7/2011 | Hanna et al. | 340/506 |
| 8,141,131 B2 * | 3/2012 | Nakamura et al. | 726/1 |
| 8,543,667 B2 * | 9/2013 | Hluchyj et al. | 709/219 |
| 8,687,801 B2 * | 4/2014 | Kim et al. | 380/28 |
| 2007/0136603 A1 * | 6/2007 | Kuecuekyan | 713/185 |
| 2007/0242821 A1 * | 10/2007 | Kim et al. | 380/28 |
| 2009/0193513 A1 * | 7/2009 | Agarwal et al. | 726/15 |
| 2009/0287835 A1 * | 11/2009 | Jacobson | 709/229 |
| 2010/0146600 A1 * | 6/2010 | Eldar et al. | 726/5 |

(Continued)

FOREIGN PATENT DOCUMENTS

| | | |
|---|---|---|
| KR | 10-2003-0080412 A | 10/2003 |
| KR | 10-2005-0099291 | 10/2005 |
| KR | 10-2007-0061605 | 6/2007 |
| KR | 10-2009-0117528 | 11/2009 |
| KR | 10-2010-0091135 | 8/2010 |

OTHER PUBLICATIONS

International Search Report issued Dec. 21, 2012 in counterpart International Patent Application No. PCT/KR2012/004601 (3 pages, in Korean).

(Continued)

*Primary Examiner* — Christopher Revak
*Assistant Examiner* — Jason C Chiang
(74) *Attorney, Agent, or Firm* — NSIP Law (57) ABSTRACT

A content protection method includes generating content protection information regarding a content to be protected by a content producer, and generating a content name indicating a location of the content in content name based networks based on the content protection information. The content protection information may include at least one of marking information indicating whether the content is protected and policy information indicating a disclosure range of the content.

31 Claims, 7 Drawing Sheets

(56) References Cited

U.S. PATENT DOCUMENTS

2010/0218177 A1\* 8/2010 Miura ............................ 717/170
2012/0151599 A1\* 6/2012 Chatfield ......................... 726/26
2013/0041982 A1\* 2/2013 Shi et al. ........................ 709/217

OTHER PUBLICATIONS

Extended European Search report issued by the European Patent Office on Apr. 9, 2015 for the corresponding EP application No. 12796868.3 (6 pages).

\* cited by examiner

NETWORK APPARATUS BASED ON CONTENT NAME AND METHOD FOR PROTECTING CONTENT

CROSS-REFERENCE TO RELATED APPLICATION(S)

This application claims the benefit under 35 U.S.C. §119 (a) of Korean Patent Application No. 10-2011-0055544, filed on Jun. 9, 2011, in the Korean Intellectual Property Office, the entire disclosure of which is incorporated herein by reference.

BACKGROUND

1. Field

The following description relates to a technology for protecting content and content-related information a contents centric network (CCN) or an information centric network (ICN).

2. Description of Related Art

In content centric networking (CCN), data communication such as content transmission is performed based on a content name. Whereas a communication host is traced using an Internet protocol (IP) address in an IP based network, a content is traced using the content name in the CCN. Hereinafter, the terms 'content' may be understood as data or information transmitted in the network.

The CCN is performed as follows. First, a certain network device may transmit a request message that includes a desired content name to neighboring network devices. Out of the neighboring network devices receiving the request message, a network device which stores a content designated in the request message may transmit a response message that includes the corresponding content to the network device that transmitted the request message.

Thus, the CCN operates in a request-response type as aforementioned. That is, the CCN is structured for receiver based communication performed in such a manner that a receiver initiates communication rather than that a transmitter initiates and controls communication. Under the receiver based communication structure, a content may be transmitted by the request of another network device irrespective of an intention of a content source or publisher. For example, a content to be shared only within a particular network domain may be transmitted to the outside by the request of an external network device out of the domain. Using a content encoding scheme, a receiver not allowed for access to a particular content may be prevented from recognizing a content object. However, content transmission may still not be prevented.

In addition, a content name, information on a network domain that generates a content, information on a content owner, and the like may be recognized by transmitting a content request message using the content name, and receiving a response message corresponding to the content request message. However, the foregoing method may cause leakage of the content and content related information, and privacy violation with respect to a content producer.

As a result, there is a need for a new technology for protecting content by preventing leakage of not only the content object but also the content related information, such as the content name and a domain name of the network, to the network or user blocked from accessing the content of the CNN.

SUMMARY

In one general aspect, a content protection method includes generating content protection information containing at least one of marking information indicating whether content is protected and policy information indicating a disclosure range of the content, and generating a content name indicating a location of the content in content name based networks, based on the content protection information.

The content protection method may further include receiving a content request message requesting transmission of the content, and determining whether to transmit a content response message responding to the content request message based on the content protection information.

The determining of whether to transmit the content response message may include confirming whether content designated by the content request message is stored, and determining whether to transmit the content response message that contains the content based on the content protection information when the content is confirmed to be stored.

The determining of whether to transmit the content response message may include confirming whether the content is set for access protection based on the marking information, and confirming whether a next-hop network device to which the content response message is to be forwarded is within the disclosure range based on the policy information when the content is confirmed to be set for the access protection.

In another general aspect, a network device includes a content protection information generation unit to generate content protection information containing at least one of marking information indicating whether content is protected and policy information indicating a disclosure range of the content, and a content name generation unit to generate content name indicating a location of the content in content name based networks, based on the content protection information.

The network device may further include a message receiving unit to receive a content request message requesting transmission of the content, and a determination unit to determine whether to transmit a content response message responding to the content request message based on the content protection information.

The determination unit may include a confirmation unit to confirm whether content contained in the content request message is stored, and a transmission determination unit to determine whether to transmit the content response message that contains the content based on the content protection information when the content is confirmed to be stored.

In still another generally aspect, a content protection method includes receiving a content request message requesting transmission of content, and determining whether to transmit the content request message using tag information set based on content protection information, wherein the content protection information includes at least one of marking information indicating whether content is protected and policy information indicating a disclosure range of the content.

The determining of whether to transmit the content request message may include confirming whether content designated by the content request message is stored, and determining whether to transmit the content request message based on the content protection information when the content is confirmed to be absent.

In a further general aspect, a network device includes a message receiving unit to receive a content request message requesting transmission of content, and a determination unit to determine whether to transmit the content request message using tag information set based on content protection information, wherein the content protection information includes at least one of marking information indicating whether the content is protected and policy information indicating a disclosure range of the content.

The determination unit may include a confirmation unit to confirm whether content designated by the content request message is stored, and a transmission determination unit to determine whether to transmit the content response message to a network device corresponding to a next-hop network device based on the content protection information and the policy information recorded in a forwarding information base (FIB) when the content is confirmed to be absent.

In a further general aspect, a content protection method includes generating content protection information containing at least one of marking information indicating whether content is protected and policy information indicating a disclosure range of the content, and determining whether to transmit a content response message corresponding to the content request message based on the content protection information.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
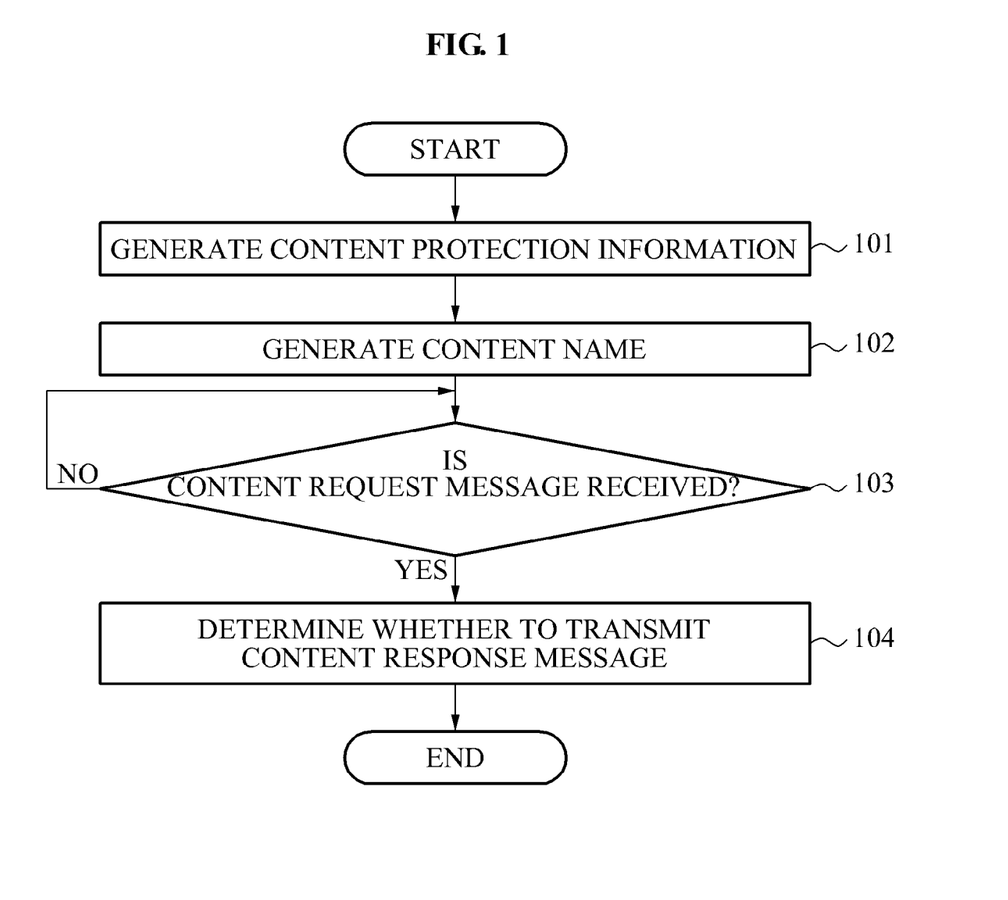
FIG. 1 is a flowchart illustrating a content protection method in a network device that generates a content according to example embodiments.

FIG. 1 is a flowchart illustrating a content protection method in a network device that generates a content according to example embodiments.

According to FIG. 1, in 101 the network device generates content protection information simultaneously, concurrently, or while generating the content. The content protection information includes marking information indicating that a content name includes a policy regarding whether to allow access of other network devices with respect to the content, and policy information indicating a disclosure range allowing, permitting, or enabling transmission of the content. The other network devices may include a network device associated with the same network domain, an external network device not belonging to the same network domain, a network device operatively connected through the Internet, and the like.

The network device may generate the marking information as a character code or a number code and so on. The marking information may indicate whether to protect the content by a tag. Also, the network device may generate the policy information as a character code, a number code, an offset, and a list. Also, the network device may generate the policy information in the form of a combination of at least one of a character code, a number code, an offset, and a list and so on.

In 102 the network device may generate the content name based on the content protection information.

The content name may be a unique identifier (ID) for identifying a corresponding content in a contents centric network (CCN). The content name may include a plurality of components and may have a hierarchical structure. For example, assuming that an organization BBB of an AAA company generates a content called news.jpg, a content name such as '/AAA.com/BBB/newsjpg' may be generated. In this case, the content name includes three components.

In addition, the content name may indicate a name of content related information, for example a network domain in which a content is generated or stored, or include at least one selected from a unique content name, content version information, a content segment number, and the content protection information. Each component may include a name of the content related information, the unique content name, the content version information, the content segment number, and the content protection information. For example, the content name may indicate a hierarchical network domain structure, or a content belonging to the hierarchical network domain.

The network device may generate the content name such that the content protection information is included in any one of the plurality of components.

In the network device, the content protection information may be located in a random location in the content name according to the content protection policy. For example, the network device may generate the content name such that the content protection information is located between a network domain component and a network domain component. Alternatively, the network device may generate the content name such that the content protection information is located between a network domain component and a unique content name component. Also, the network device may generate the content name such that the content protection information is located between a unique content name component and a content version information component.

The content protection information may be located within a range applying a digital signature generated from the content response message.

In addition, the network device may generate the content name such that the content protection information is included in a random location in the content name. In this case, the content protection information may be located within a content name range applying the digital signature generated from the content response message. Also, an object of protection may be varied according to the location of the content protection information. For example, when access of other network devices is not allowed with respect to a particular network domain and a content name belonging to the network domain, the network device may generate the content name such that the content protection information is located sequentially after the name component of the network domain to be protected, as shown in Table 1 below.

TABLE 1

| | Content name | |
|---|---|---|
| Domain name information | Content protection information | Content file name (optional) |
| /AAA.xxx/BBB/CCC/DDD | Security_info (= marking info. + policy info.) | /EEE.zzz |

According to Table 1, when a request message related to the domain name to be protected or a content name including the domain name is received, the network device may block transmitting of the domain name to another network device based on the content protection information. For example, in the CCN, a request message may be expressed as INTEREST.

When receiving the INTEREST requesting a network domain named /AAA.xxx/BBB/CCC/DDD or a content named /AAA.xxx/BBB/CCC/DDD/EEE/zzz according to the case of Table 1, the network device may recognize that the content protection information is located after the domain name /AAA.xxx/BBB/CCC/DDD. Accordingly, the network device may block transmitting of the domain name or the content to another content device based on the content protection information. The network device may generate the content protection information per domain name. For example, the network device may generate content protection information related to a domain BBB, content protection information related to a domain CCC, and content protection information related to a domain DDD, respectively.

According to Table 1, the plurality of components constituting the content name and the network domain name may be classified into single components by each slash (/). For example, when the content name or the network domain name is /AAA.xxx/BBB/CCC/DDD/Security_info, AAA.xxx may refer to a first component, BBB a second component, CCC a third component, DDD a fourth component, and Security_info a fifth component. Thus, the domain name in Table 1 may include five components.

As another example, when not allowing access of another network device with respect to a content having a particular content name, the network device may generate the content name such that the content protection information is located after a content file name component to be protected, as shown in Table 2.

TABLE 2

| Content name | | | | |
|---|---|---|---|---|
| Domain name | Content file name | Version information | Content protection information | Segment number |
| /AAA.xxx/BBB/ CCC/DDD | EEE.zzz | Version # | Security_info | Segment # |

According to Table 2, the domain name may be information hierarchically indicating a network domain in which a content is stored or generated. Here, the content file name may be information indicating a name of a content generated by a content producer. The version information may be information indicating a version of the generated content. The segment number may be information indicating numbers allocated to a plurality of segments of the generated content.

In addition, according to Table 2, the network device may generate the content name such that the content protection information is located in a component, among the plurality of components, corresponding to the range applying the digital signature with respect to the content. For example, the network device may generate the content name such that the content protection information is located between the version information and the segment information, that is, where the digital signature is applied.

The content protection information may be located in any one of the plurality of components, which corresponds to the range applying the digital signature. The component refers to a unit dividing respective information included in the content name. The content protection information may include a single component. When the domain name includes four hierarchical network domain names as shown in Table 2, the domain AAA.xxx, the domain BBB, the domain CCC, and the domain DDD may each include a single component. In other words, the domain name information may include four components. Additionally, the content file name, the version information, and the segment number may each include a single component. The network device may generate the content name in such a manner that the content protection information is located after the content file name.

In 103, the network device may receive the content request message. For example, the network device may receive the content request message from a next-hop network device to which the content response message is to be forwarded. The next-hop network device to which the content response message is to be forwarded may be included in a higher level network domain.

The content request message may contain at least one of the content object, the network domain name corresponding to the content, a content list and information including contents belonging to a particular network domain, and domain hierarchy information. The content object may refer to a file generated by the content producer. The domain hierarchy information may refer to information indicating a hierarchical relationship with at least one network domain.

For example, the network device may receive the content request message requesting information related to the domain DDD as shown in Table 3.

TABLE 3

| Content request message | |
|---|---|
| Content protection protocol used | ccns_Interest://AAA.xxx/BBB/ CCC/DDD |
| Content protection protocol not used | ccn_Interest://AAA.xxx/BBB/CCC/DDD |

According to Table 3, the content request message may use two protocol indicators to inform whether a content protection protocol is used in the network. For example, the protocol indicator may be expressed as ccns Interest to inform that the network device that requests transmission of information related to the domain DDD such as sub-domain lists or content lists is using the content protection protocol. Also, the content request message may be expressed as ccn_Interest to inform that the network device is not using the content protection protocol. In other words, the network device may compatibly use ccn and ccns protocols as http and https protocols are used compatibly. The content protection protocol may define that the content is shared or not shared with other network devices based on the content protection information.

Next, in 104, the network device may determine whether to transmit a content response message responding to the content request message based on the content protection information.

Hereinafter, a structure for determining whether to transmit the content response message will be described with reference to FIG. 2.

Figure 2:
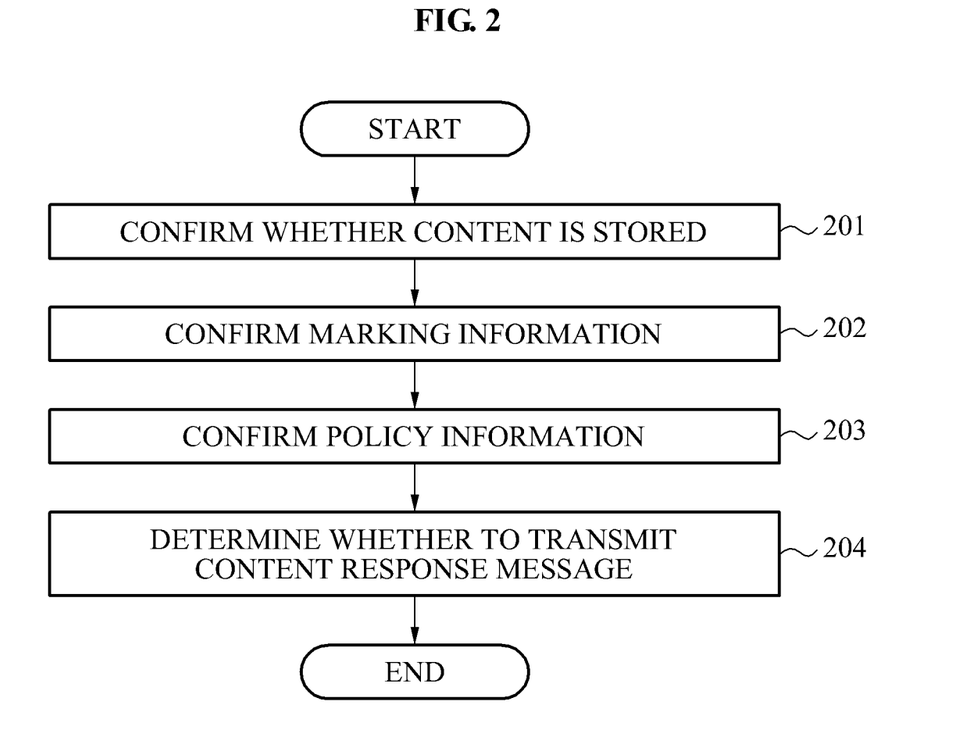
FIG. 2 is a flowchart illustrating a method for determining whether to transmit a content response message to protect a content in a network device storing the content, according to example embodiments.

FIG. 2 is a flowchart illustrating a method for determining whether to transmit a content response message to protect a content in a network device storing the content, according to example embodiments.

According to FIG. 2, in operation 201, the network device may confirm whether the content is stored by receiving a content request message.

For example, the network device may confirm whether content corresponding to the content request message is stored in a content store (CS). In one example, the CS may be a cache that stores content. The network device may be provided with a separate data storage (not shown) storing at least one content.

Next, when it is confirmed that the content is stored in the CS, the network device may determine whether to transmit the content response message based on the content protection information corresponding to the stored content.

For this purpose, first, the network device may confirm marking information contained in the content protection information in 202. The network device may confirm whether the content is set for access protection. In this instance, the marking information may be expressed by a tag in the form of a character code or a number code.

As an example, when the marking information includes a character code "S" which means 'secure', the network device may confirm that the content corresponding to the content request message is set for the access protection.

As another example, when the marking information includes a character code "NS" which means 'non-secure', the network device may confirm that the content corresponding to the content request message is set for the access protection. That is, the network device may confirm that access of other network devices to the content is permitted.

As still another example, when the marking information includes a number '1', the network device may confirm that the content corresponding to the content request message is set for the access protection.

As yet another example, when the marking information includes a number '0', the network device may confirm that the content corresponding to the content request message is allowed for access.

Next, in 203, when the marking information is confirmed, the network device may confirm the policy information contained in the content protection information. That is, the network device may confirm whether a next-hop network device to which the response message is to be forwarded is included in a disclosure range, based on the policy information. In one example, the policy information may include an offset, a character code, a number code, a pseudo code, or a domain list showing a number or range of domains to disclose the content. The number of domains may refer to a number of highest level network domains to which the content belongs, which is expressed by a root (/), or a number of network domains hierarchically connected with reference to the content itself.

For example, when a root domain, that is, the highest level network domain is the reference and the policy information includes an offset '2', the network device may confirm that the content may be shared with or disclosed up to a second sub-domain with reference to the root domain. That is, when the content request message ccn Interest://AAA.xxx/BBB/CCC/DDD is received to the network device of the domain DDD and when the domain DDD is the network domain actually having the content protection policy, the network device of the domain DDD may transmit the content response message in accordance with the content protection policy. Here, a name of the domain DDD may be 'content protection information (policy information) of /AAA.xxx/BBB/CCC/DDD/DDD.' When the policy information of DDD includes the offset '2', the network device may confirm that a hierarchy of the domain DDD cannot be shared with or disclosed to a network device and a root corresponding to the domain BBB which corresponds to the offset '2' with reference to a root AAA.xxx, but can be shared with or disclosed to a network device corresponding to the domain CCC.

In 204, the network device may forward a content response message depending on whether the policy information is confirmed.

For example, when it is confirmed that the next-hop network device to which the content response message is to be forwarded is excluded from the disclosure range based on the policy information, the network device may block transmitting of the content response message to the next-hop network device. That is, the network device may ignore and not respond to the content request message. Accordingly, the content to be protected may be prevented from being transmitted to a network device undesired for sharing or disclosure of the content.

As another example, when the next-hop network device is included in the disclosure range based on the policy information, the network device may transmit the content response message responding to the content request message to the network device corresponding to the higher level domain. In one example, the content response message may include at least one of a domain name, a content file name, version information, a segment number, the content protection information, and content data in the form of a file.

When the content protection information is set to be different according to network domains, the network device may determine whether to share or disclose the content with respect to other networks, based on a priority.

For example, content protection information 1 may be generated so that a sub-domain name and contents are not shared with or disclosed to an external domain in a higher level domain. In addition, content protection information 2 may be generated so that contents belonging to a sub-domain are shared with or disclosed to an external domain in the sub-domain. In this case, the content protection information 1 related to the higher level domain may have a higher priority than the content protection information 2 related to the sub-domain. That is, the network device may prevent sharing or disclosing of the content belonging to the sub-domain with or to another network device belonging to the external domain.

With reference to FIG. 2, it has been described that the network device determines whether to transmit the content response message by confirming the marking information. However, since this is only an example embodiment, the network device may determine whether to transmit the content response message based on presence of the marking information.

For example, in 202, the network device may confirm whether there is a component where the marking information is located among the plurality of components constituting the content name. In one configuration, when the marking information is determined to be absent, the network device may not need to execute a security policy and therefore directly determine to transmit the content response message. When the marking information is determined to be present, the network device may confirm that data subsequent to the marking information is the policy information. Therefore, the network device may have to execute the security policy according to the policy information. Accordingly, the network device may confirm the disclosure range of the content based on the policy information, and determine whether to transmit the content response message as described in 203 and 204.

Egress filtering as described in FIGS. 1 and 2 will be explained in further detail with reference to FIG. 3.

Figure 3:
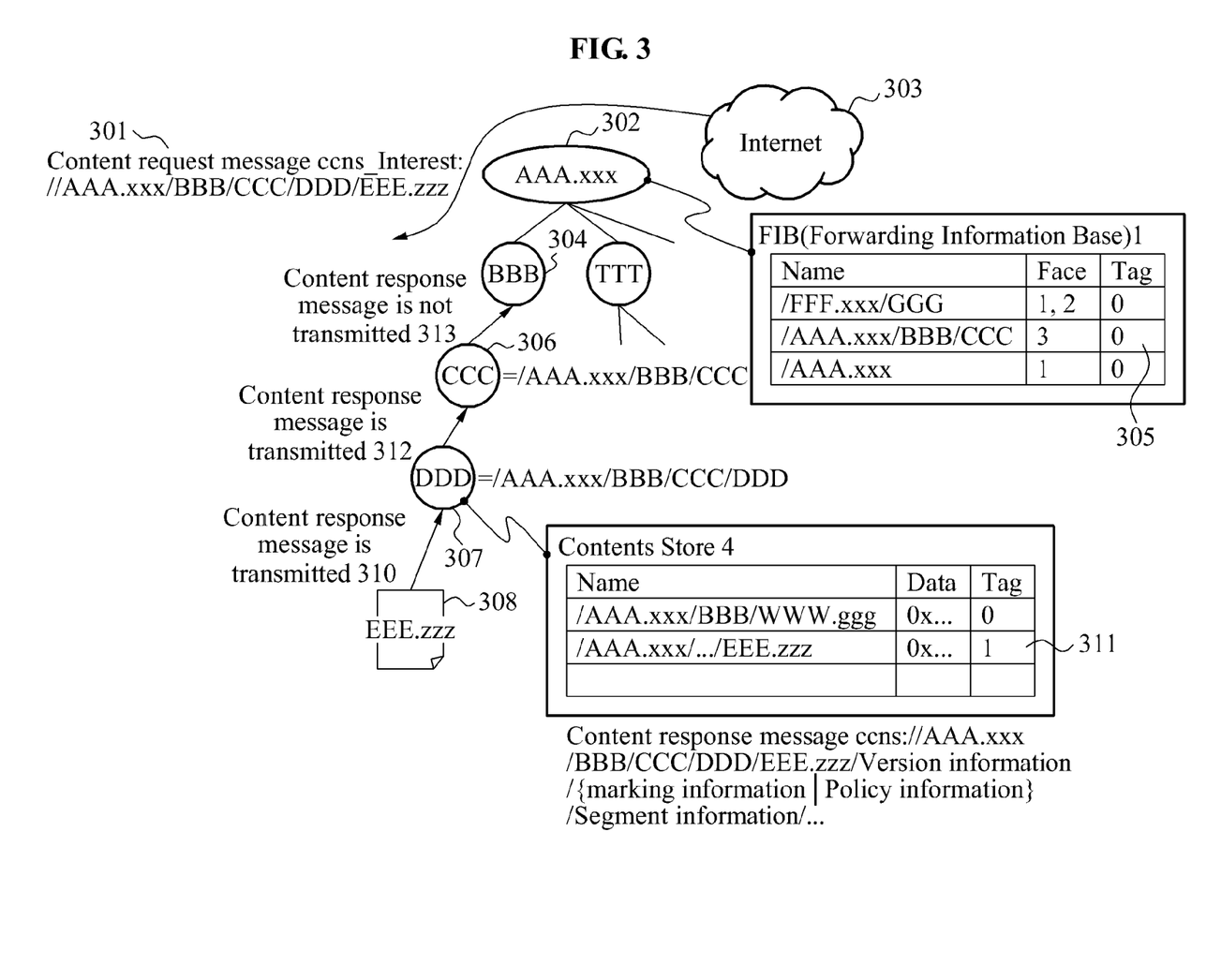
FIG. 3 is a flowchart illustrating a method for controlling transmission of a content response message in a network device according to example embodiments.

FIG. 3 illustrates a method for controlling transmission of a content response message in a network device according to example embodiments.

According to FIG. 3, based on content protection information, the network device may control whether to transmit content corresponding to a content request message to a network device corresponding to a higher level domain. In one configuration, when a content request message related to content to be protected is generated, the content request message may be transmitted to the network device storing the content. In addition, the network device storing the content and all network devices corresponding to a root domain may control whether to transmit the content to the network device corresponding to a higher level domain or an external network device through the Internet, based on the content protection information, tag information in a forwarding information base (FIB), or tag information included in a CS. As aforementioned, transmission of the content response message including the content may be determined per hierarchy from the network device storing the content to the network device corresponding to the root domain, in a similar manner to Egress filtering performed by a firewall in an IP-based network. Therefore, when the Egress filtering is applied, a network device storing a content and higher level domains of a network device storing a content may both receive the content request message. However, the content request message is prevented from being shared with or disclosed to a network device not included in a disclosure range.

In FIG. 3, a first network device 302 corresponding to the root may receive a content request message requesting transmission of EEE.zzz in a file form through an Internet 303 from an external network device. For example, the first network device 302 may receive a content request message 301 in the form of ccns_Interest://AAA.xxx/BBB/CCC/DDD/EEE.zzz.

Next, the first network device 302 may confirm whether content corresponding to the content request message 301 is stored in a first CS. When it is confirmed that the content is absent in the first CS, the first network device 302 may record a content request message in a pending interest table (PIT) in the first network device 302.

In addition, the first network device 302 may determine an interface 305 corresponding to a second network device 304 to which the content request message 301 is to be transmitted, by referring to a first FIB. In the CCN, the interface 305 may be referred to as a face and may include a port number. For example, the first network device 302 may determine the interface 305 using longest matching between the content request message 301 and messages recorded in the first FIB. Additionally, the first network device 302 may transmit the content request message 301 to the second network device 304 through the interface 305. Here, the content response message in the CCN may be expressed as data.

In the same manner, the second network device 304 may transmit the content request message 301 to a third network device 306 which is a next-hop network device. The third network device 306 may transmit the content request message 301 to a fourth network device 307, and the fourth network device 307 may transmit the content request message 301 to a fifth network device 308. Accordingly, the fourth network device 307 may confirm whether the content corresponding to the content request message 301 is stored in a fourth CS.

Here, when it is confirmed that the content is stored in the fourth CS, the fourth network device 307 may confirm the disclosure range of the content based on tag information of the fourth CS.

For example, when tag information corresponding to the content is set to '1' denoted by a reference numeral 311, the fourth network device 307 may confirm that the content corresponding to the content request message 301 is set to be protected. Therefore, the fourth network device 307 may determine whether to transmit the content to the third network device 306, based on content protection information related to the content.

For example, when policy information corresponding to the content request message 301 includes '3', the fourth network device 307 may confirm that the content may be shared with or disclosed to the third network device 306 corresponding to a third domain from the root.

Accordingly, the fourth network device 307 may transmit the content response message responding to the content request message to the third network device 306, in 312.

Here, the content response message may contain domain name, content file name, content protection information, and content data. When the content data has various versions and is classified into a plurality of segments, the content response message may further contain version information and segment information.

In the same manner, the third network device 306 may set tag information corresponding to the received content based on the content protection information designated by the content response message. When the received content is confirmed as the protected content, the third network device 306 may confirm that a disclosure range of the content extends up to the third network device 306 corresponding to the third domain from the root. That is, the third network device 306 may confirm that the second network device 304 is not included in the disclosure range of the content, based on the policy information.

In this case, the third network device 306 may not transmit the content response message responding to the content request message to the second network device 304 in operation 313. Thus, since the content response message is not transmitted to the network device beyond the disclosure range of the content corresponding to the content request message, the content that a content producer wants to protect may be protected.

Figure 4:
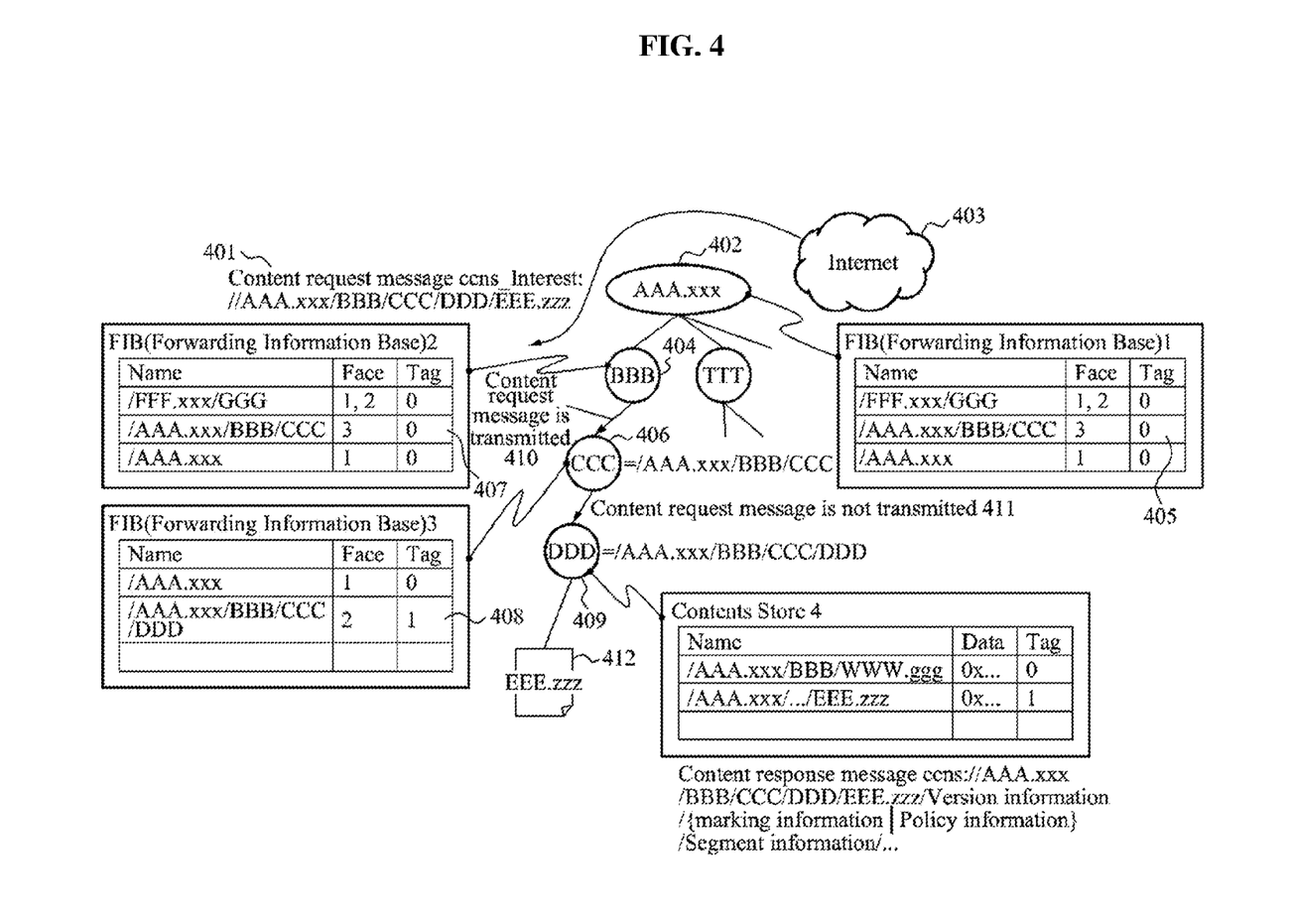
FIG. 4 is a flowchart illustrating a method for controlling transmission of a content request message in a network device according to example embodiments.

FIG. 4 is illustrates a method for controlling transmission of a content request message in a network device according to example embodiments.

According to FIG. 4, the network device may control whether to transmit a content request message to a next-hop network device, based on an FIB or tag information included in the FIB. The next-hop network device may refer to a network device included in a sub network domain.

When the content request message with respect to content to be protected is generated, the next-hop network device to which the content response message is to be forwarded may prevent transmission of the content request message to a next-hop network device, in a similar manner to Ingress filtering performed by a firewall in an IP-based network. The next-hop network device may refer to a network device included in a higher level network domain.

When the Ingress filtering is applied, the network device storing the content corresponding to the content request message may be unaware of generation of the content request message.

In FIG. 4, a first network device 402 corresponding to a root may receive a content request message requesting transmission of EEE.zzz in a file form through an Internet 403 from an external network device. For example, the first network device 402 may receive a content request message 401 in the form of ccns_Interest://AAA.xxx/BBB/CCC/DDD/EEE.zzz.

Next, the first network device 402 may confirm whether content corresponding to the content request message 401 is stored in a first CS.

When it is confirmed that the content is absent in the first CS, the first network device 402 may record the content request message 401 in its first PIT.

In addition, the first network device 402 may determine an interface 405 corresponding to a second network device 404 to which the content request message 401 is to be transmitted, by referring to a first FIB. In the CCN, the interface may be referred to as a face and may include a port number. For example, the first network device 402 may determine the interface 405 using longest matching between the content request message 401 and messages recorded in the first FIB.

In addition, the first network device 402 may determine whether to transmit the content request message 401 to a second network device 403, which is a next-hop network device, through the determined interface 405 based on tag information corresponding to the determined interface 405. The next-hop network device may refer to a network device included in a sub network domain. For example, when the tag information corresponding to the interface 405 is '0', the first network device 402 may confirm that a domain name '/AAA.xxx/BBB/CCC' is not set as protected content. Therefore, the first network device 402 may transmit the content request message through the interface 405 to the second network device 404.

In the same manner, when receiving the content request message 401, the second network device 404 may confirm whether the content corresponding to the content request message 401 is stored in a second CS. When it is confirmed that the content is absent in the second CS, the second network device 404 may record the content request message 401 in its second PIT. Next, the second network device 404 may determine an interface 407 corresponding to a third network device 406 to which the content request message 401 is to be transmitted, by referring to a second FIB. Also, the second network device 404 may transmit the content request message 401 to the third network device 406 through the determined interface 407.

In addition, the second network device 404 may determine whether to transmit the content request message 401 to the third network device 406 corresponding to a sub-domain through the determined interface 407, based on tag information corresponding to the determined interface 407. Here, when the content request message is determined to be transmittable to the third network device 406, the second network device 404 may transmit the content request message 401 to the third network device 406 through the interface 407.

In the same manner, the third network device 406 may determine an interface 408 corresponding to a fourth network device 409 to which the content request message 401 is to be transmitted, using longest matching in a third FIB. In addition, the third network device 406 may determine whether to transmit the content request message 401 to the fourth network device 409 corresponding to a sub-domain based on tag information corresponding to the determined interface 408.

For example, in the third FIB, when the tag information corresponding to the interface 408 is set to '1', the third network device 406 may confirm that '/AAA.xxx/CCC/DDD' is content set to be protected. Therefore, the third network device 406 may not transmit the content request message 401 to the fourth network device 409 corresponding to the sub-domain, in operation 411. Thus, since the third network device 406 ignores the content request message 401 based on the tag information in the fourth FIB and prevents transmitting of the content request message 401 to the fourth network device 409, the fourth network device 409 may not receive the content request message 401 or not transmit a content 412 stored in the fourth network device 409. Accordingly, the content corresponding to the content request message 401 may be shared with or disclosed to only the fourth network device 409, and the third network device 406 that are included in a disclosure range of the content. That is, a content may be prevented from being shared with or disclosed to other network devices beyond the disclosure range.

Figure 5:
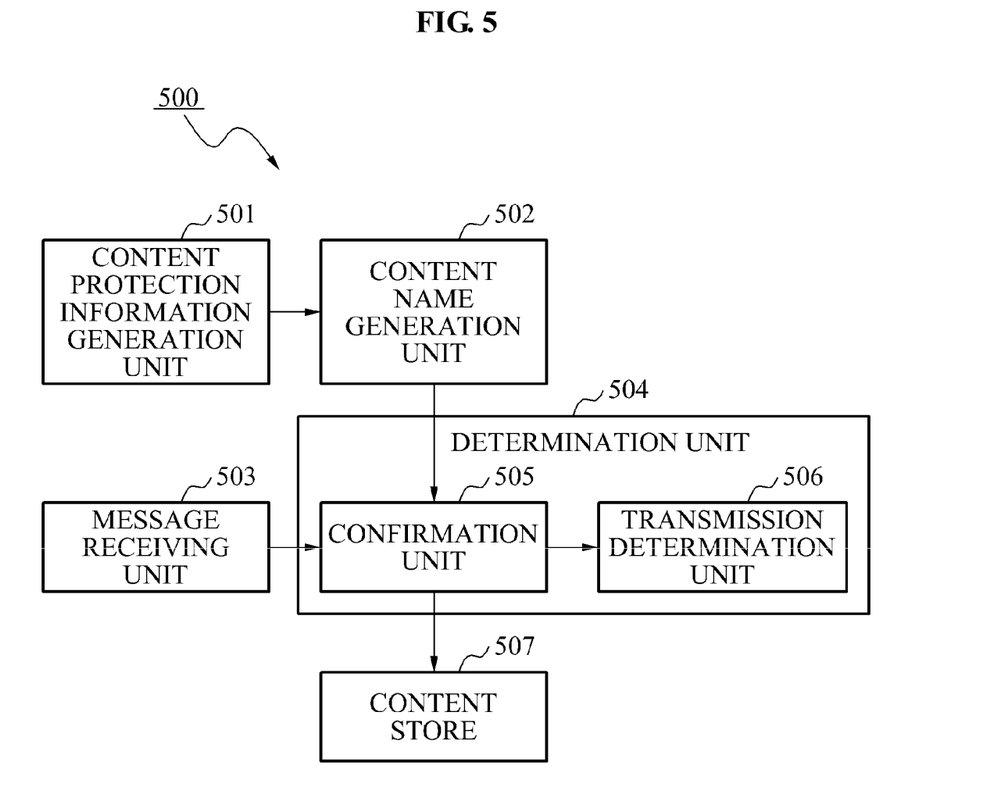
FIG. 5 is a block diagram illustrating a detailed structure of a network device according to example embodiments.

FIG. 5 illustrates a detailed structure of a network device 500 according to example embodiments.

According to FIG. 5, the network device 500 includes a content protection information generation unit 501, a content name generation unit 502, a message receiving unit 503, a determination unit 505, and a CS 507.

The content protection information generation unit 501 may generate content while also generating content protection information which includes marking information indicating whether the generated content is protected and policy information indicating a disclosure range of the content. The marking information may indicate that a content name contains a policy regarding whether to allow or prevent access of at least one of another network device and an external network device with respect to the content. The policy information may indicate the disclosure range allowing sharing and disclosure of the generated content among network devices corresponding to respective domains having a hierarchical structure. For example, the content protection information generation unit 501 may generate the policy information as an offset, a number or character code, a pseudo code, or a domain list.

Based on the content protection information, the content name generation unit 502 may generate content name indicating a location, that is, a path, of the content in the name based network. The content name may include at least one of domain name information, content name information, version information, the content protection information, and segment information.

In one configuration, the content name may include a plurality of components. The content protection information may include one of the components. That is, the content name generation unit 502 may generate the content name such that the content protection information is included in one of the components. Specifically, the content name generation unit 502 may generate the content name such that the content protection information is located in a range applying a digital signature with respect to the content, among the components.

For example, to protect a domain name and a content name belonging to the domain, the content name generation unit 502 may generate the content name such that content protection information is located continuously after a component where the domain name information is located.

As another example, to protect the content name, the content name generation unit 502 may generate the content name such that the content protection information is located after a component where content name information is located among the plurality of components. For example, when the version information and the segment information with respect to the generated content are included, the content name generation unit 502 may generate the content name such that the content protection information is located between the version information and the segment information.

The message receiving unit 503 may receive a content request message requesting transmission of content from another network device. For example, the message receiving unit 503 may receive the content request message from a next-hop network device. For example, the content request message may contain at least one of content data, content name information, domain name information, domain hierarchy information, and content list information.

Therefore, the determination unit 504 may determine whether to transmit a content response message responding to the content request message to another network device, based on the content protection information. Here, the determination unit 504 may include a confirmation unit 505 to confirm whether the content designated by the content request message is stored in the CS 507, and a transmission determination unit 506 to determine whether to transmit the content response message containing the content base on the content protection information.

For example, when it is confirmed that the content is stored in the CS 507, the confirmation unit 505 may confirm whether the content is protected from access based on the marking information. When the content is confirmed to be protected information, the confirmation unit 505 may confirm the disclosure range of the content corresponding to the content request message. That is, the confirmation unit 505 confirms whether the network device is included in the disclosure range. When the network device is confirmed to be included in the disclosure range, the transmission determination unit 506 may transmit the content response message responding to the content request message to the network device corresponding to the higher level domain.

Conversely, when it is confirmed that the network device corresponding to the higher level domain is not included in the disclosure range, the transmission determination unit 506 may determine to prevent transmitting of the content response message to the network device. The content response message may contain at least one of the domain name, content name, the content protection information, the version information, the segment information, and the content data. Accordingly, when the content response message is not transmitted to the network device based on the content protection information, the content may be prevented from being shared with or disclosed to network devices not included in the disclosure range.

Figure 6:
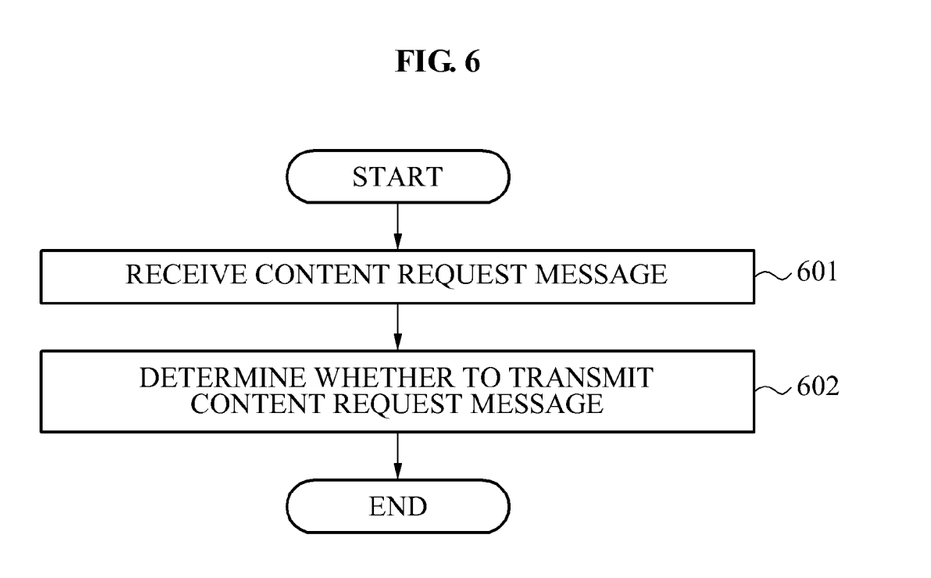
FIG. 6 is a flowchart illustrating a method for relaying a content request message in a network device according to example embodiments.

FIG. 6 illustrates a method for relaying a content request message in a network device according to example embodiments. In FIG. 6, the network device may be a relay network device that transmits the content request message among network devices performing the CCN.

According to FIG. 6, in 601, the network device may receive a content request message requesting transmission of content. Here, the content request message may include at least one of content data, a content file name, a domain name, content list information including contents belonging to the domain, and domain hierarchy information.

In 602, the network device may determine whether to transmit the content request message using tag information set based on content protection information. The content protection information may include marking information indicating whether the content is protected, and policy information indicating a disclosure range of the content. The network device may set tag information of a CS or tag information of an FIB. The tag information may set whether the content corresponding to the content request message is protected content according to the marking information.

For example, the network device may confirm whether the content content request message the content request message is stored in the CS. When the content is confirmed to be absent, the network device may record the content request message in its PIT. Next, the network device may determine whether to transmit the content request message to a next-hop network device based on the tag information of the FIB. The next-hop network device may refer to a network device included in a sub network domain.

When the content is determined to be the protected content based on the tag information, the network device may determine to prevent transmitting of the content request message to the network device corresponding to the sub-domain. When the content is determined to be not the protected content based on the tag information, the network device may determine to transmit the content request message to the next-hop network device. Since ingress filtering performed in this manner is already described with reference to FIG. 4, a detailed description thereof will be omitted for conciseness.

Figure 7:
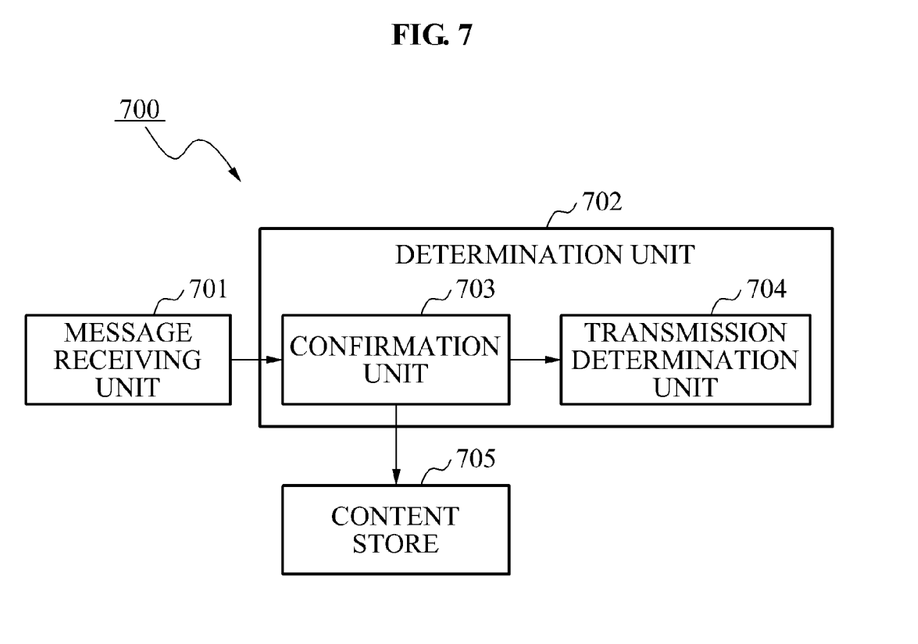
FIG. 7 is a block diagram illustrating a detailed structure of a network device that relays a content request message according to example embodiments.

FIG. 7 illustrates a detailed structure of a network device 700 that relays a content request message according to example embodiments.

According to FIG. 7, the network device 700 includes a message receiving unit 701, a determination unit 702, and a CS 705.

First, the message receiving unit 701 may receive the content request message requesting transmission of content. For example, the message receiving unit 701 may receive the content request message from a network device corresponding to a higher level domain.

The determination unit 702 may determine whether to transmit the content request message to a next-hop network device using tag information set based on content protection information. Here, the content protection information may include marking information indicating whether the content is protected and policy information indicating a disclosure range of the content. The determination unit 702 may include a confirmation unit 703 and a transmission determination unit 704.

The transmission determination unit 704 may determine whether to transmit the content request message based on the content protection information. As access protection with respect to the content is confirmed, the transmission determination unit 704 may determine whether the content request message needs to be transmitted to a next-hop network device, based on content protection information and policy information recorded in an FIB. The next-hop network device may refer to a network device included in a sub network domain. As it is confirmed that a content designated by the content request message is absent, the transmission determination unit 704 may determine whether to transmit the content request message based on the content protection information.

When it is confirmed that the content request message does not need to be transmitted to the next-hop network device, the transmission determination unit 704 may determine not to transmit the content request message to the next-hop network device.

In addition, when the content request message needs to be transmitted to the next-hop network device or when it is not confirmed that transmission of the content request message is unnecessary, the transmission determination unit 704 may determine to transmit the content request message to the next-hop device.

When receiving the content request message, the confirmation unit 703 may confirm whether the content corresponding to the content request message is stored in the CS 705. When the content is confirmed to be absent, the network device may record the content request message in a PIT. In addition, the confirmation unit 703 may confirm whether the content is set for access protection based on the marking information.

Additionally, when the content is confirmed to be absent, the network device may determine whether to transmit the content request message to the next-hop network device. Conversely, when the content is confirmed to be stored, the network device may determine whether to transmit the content request message to the next-hop network device based on the tag information of the CS. Here, the tag information may set whether the content corresponding to the content request message is protected content according to the marking information.

When the content corresponding to the content request message is the protected content, the network device may determine to prevent transmitting of the content request message to the next-hop network device. When the content is not the protected content, the network device may determine to transmit the content request message to the network device corresponding to the sub-domain. Since Ingress filtering performed in this manner is already described with reference to FIG. 4, a detailed description thereof will be omitted for conciseness.

A structure where a network device that generated content controls sharing or disclosure of the content with at least one of another network device and an external network device using content protection information containing marking information and policy information has been described. Here, the marking information may indicate that a content name contains a policy regarding whether to allow or prevent access of at least one of another network device or an external network device to the content.

That is, the marking information may indicate not only whether the content is set as protected content or non-protected content but also that a character string, data, and the like located after the marking information is the policy information.

For example, when the content name is /AAA.xxx/BBB/CCC/ SS_policy 1/_Version 2.0, the network device may parse the content name in units of slash (/). Here, the content name may indicate an entire content name.

Therefore, the network device may understand through parsing that AAA.xxx, BBB, and CCC are information indicating content name information and domain name information and that a content version is 2.0 since a number subsequent to _Version_ is 2.0. In addition, the network device may confirm through parsing that a policy 1 subsequent to _SS_ is to be executed. Thus, the marking information may inform the network device that the character string and data located subsequent to the marking information are to be used as the policy information.

In other words, the network device may determine whether to execute or not a security policy based on presence of the marking information in the content name. Accordingly, when a component containing the marking information is absent in the content name, the network device may not execute the security policy for protection of the content. When a component containing the marking information is present, the network device may confirm that the data located subsequent to the marking information is the policy information, and execute the security policy for protection of the content.

As aforementioned, according to the example embodiments, by controlling access to content based on content protection information, a content producer may protect the content from sharing or disclosure with respect to an undesired user or network device.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content protection method for a network device comprising:
   generating content protection information containing marking information indicating whether content is protected and policy information indicating a disclosure range of the content;
   generating a content name indicating a location of the content in content name based networks, based on the content protection information;
   receiving a content request message requesting transmission of the content; and
   determining whether to transmit a content response message responding to the content request message based on the content protection information and a location of the content protection information,
   wherein the location of the content protection information with respect to an object being protected determines a level of protection of the object.

2. The content protection method of claim 1, wherein the generating of the content protection information generates the content protection information while generating the content, and
   the marking information indicates that the content name contains a policy regarding whether to allow or prevent access of at least one of another network device and an external network device with respect to the content.

3. The content protection method of claim 1, wherein the generating of the content protection information generates the policy information in the form of any of an offset, a number, a pseudo code, and a domain list, and
   the policy information indicates the disclosure range in which transmission of the content is allowed.

4. The content protection method of claim 1, wherein
the content name comprises a plurality of components, and the content protection information comprises a single component included in the content name.

5. The content protection method of claim 4, wherein
the generating of the content name generates the content name such that the content protection information is located within a range allowing a digital signature with respect to the content among the plurality of components.

6. The content protection method of claim 1, wherein the generating of the content name is performed such that the content protection information is located sequentially after a component where network domain name information is located.

7. The content protection method of claim 1, wherein the generating of the content name is performed such that the content protection information is located after a component where content name information is located.

8. The content protection method of claim 1, wherein the generating of the content name is performed such that the content protection information is located between version information and segment information.

9. The content protection method of claim 1, wherein the determining of whether to transmit the content response message comprises:
confirming whether content designated by the content request message is stored; and
determining whether to transmit the content response message that contains the content based on the content protection information when the content is confirmed to be stored.

10. The content protection method of claim 9, wherein the determining of whether to transmit the content response message comprises:
confirming whether the content set for access protection based on the marking information; and
confirming whether a network device corresponding to a higher level domain is within the disclosure range based on the policy information when the content is confirmed to be set for the access protection.

11. The content protection method of claim 10, wherein the determining of whether to transmit the content response message comprises:
determining to prevent transmitting of the content response message when the network device corresponding to the higher level domain is confirmed to be beyond the disclosure range.

12. The content protection method of claim 10, wherein the determining of whether to transmit the content response message comprises:
determining to transmit the content response message to the network device corresponding to the higher level domain when the network device corresponding to the higher level domain is confirmed to be within the disclosure range.

13. The content protection method of claim 1, wherein the content request message comprises at least one selected from a content name, a content object, a domain name of a content network, a domain hierarchy of the content network, and a content list included in a domain of a particular content network.

14. The content protection method of claim 1, wherein the content name comprises at least one selected from a domain name of a content network, a unique content name, version information of a content, the content protection information, and segment information.

15. The content protection method of claim 1, wherein the content name includes a unique identifier for identifying the content in the content name based networks.

16. The content protection method of claim 1, wherein the content name includes a hierarchical network domain structure or content belonging to the hierarchical network domain structure.

17. The content protection method of claim 1, wherein the disclosure range of the content includes an offset, a character code, a number code, a pseudo code, or a domain list showing a range of domains to disclose the content.

18. A network device comprising:
a content protection information generation unit to generate content protection information containing marking information indicating whether content is protected and policy information indicating a disclosure range of the content;
a content name generation unit to generate the content name indicating a location of the content in content name based networks, based on the content protection information;
a message receiving unit to receive a content request message requesting transmission of the content; and
a determination unit to determine whether to transmit a content response message responding to the content request message based on the content protection information and a location of the content protection information,
wherein the location of the content protection information with respect to an object being protected determines a level of protection of the object.

19. The network device of claim 18, wherein the content protection information generation unit generates the content protection information while generating the content, and
the marking information indicates that the content name contains a policy regarding whether to allow or prevent access of at least one of another network device and an external network device with respect to the content.

20. The network device of claim 18, wherein the content protection information generation unit generates the policy information in the form of any of an offset, a number, a pseudo code, and a domain list, and
the policy information indicates a disclosure range in which transmission of the content is allowed.

21. The network device of claim 18, wherein
the content name comprises a plurality of components, and the content protection information comprises a single component included in the content name.

22. The network device of claim 21, wherein the content protection information generation unit generates the content name such that the content protection information is located within a range allowing a digital signature with respect to the content among the plurality of components.

23. The network device of claim 18, wherein the content name generation unit generates the content name such that the content protection information is located sequentially after a component where domain name information is located.

24. The network device of claim 18, wherein the content protection information generation unit generates the content name such that the content protection information is located after a component where content name information is located.

25. The network device of claim 18, wherein the content name generation unit generates the content name such that the content protection information is located between version information and segment information.

26. The network device of claim 18, wherein the determination unit comprises:

a confirmation unit to confirm whether content designated by the content request message is stored; and a transmission determination unit to determine whether to transmit the content response message that includes the content based on the content protection information when the content is confirmed to be stored.

27. The network device of claim 26, wherein the confirmation unit confirms whether the content is protected from access based on the marking information when the content is confirmed to be stored, and also confirms whether a network device corresponding to a higher level domain is included in the disclosure range based on the policy information when the content is confirmed to be protected from access.

28. The network device of claim 27, wherein the transmission determination unit determines to prevent transmitting of the content response message when the network device corresponding to the higher level domain is confirmed to be beyond the disclosure range.

29. The network device of claim 27, wherein the transmission determination unit determines to transmit the content response message to the network device corresponding to the higher level domain when the network device corresponding to the higher level domain is confirmed to be within the disclosure range.

30. The network device of claim 18, wherein the content request message comprises at least one selected from a content name, a content object, a domain name of a content network, a domain hierarchy of the content network, and a content list included in a domain of a particular content network.

31. The network device of claim 18, wherein the content name comprises at least one selected from a domain name of a content network, a unique content name, version information of a content, the content protection information, and segment information.

* * * * *